United States Patent
Welin et al.

(10) Patent No.: US 10,540,879 B2
(45) Date of Patent: Jan. 21, 2020

(54) STICKER, CONDITION MONITORING SYSTEM, METHOD AND COMPUTER PROGRAM PRODUCT

(71) Applicant: Aktiebolaget SKF, Gothenburg (SE)

(72) Inventors: Anders Welin, Torslanda (SE); Svetoslav Staykov, Varna (BG)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/980,027

(22) Filed: May 15, 2018

(65) Prior Publication Data

US 2018/0261074 A1    Sep. 13, 2018

Related U.S. Application Data

(62) Division of application No. 15/407,032, filed on Jan. 16, 2017, now Pat. No. 10,019,886.

(30) Foreign Application Priority Data

Jan. 22, 2016    (SE) ..................................... 1650073

(51) Int. Cl.
| | | |
|---|---|---|
| *G08B 21/18* | (2006.01) | |
| *G01H 3/10* | (2006.01) | |
| *G01H 1/00* | (2006.01) | |
| *G01K 1/02* | (2006.01) | |

(52) U.S. Cl.
CPC ........... *G08B 21/187* (2013.01); *G01H 1/003* (2013.01); *G01H 3/10* (2013.01); *G01K 1/02* (2013.01); *G08B 21/182* (2013.01)

(58) Field of Classification Search
CPC ... G08B 21/182; G08B 21/187; F16C 19/527; F16C 19/522
See application file for complete search history.

(56) References Cited

U.S. PATENT DOCUMENTS

| | | | |
|---|---|---|---|
| 4,029,859 A | 6/1977 | Armstrong | |
| 5,602,761 A * | 2/1997 | Spoerre | G01H 1/003 702/179 |
| 6,008,727 A | 12/1999 | Want | |
| 6,297,742 B1 | 10/2001 | Canada | |
| 2002/0062694 A1* | 5/2002 | Ehrfeld | F16C 19/522 73/593 |
| 2003/0030565 A1* | 2/2003 | Sakatani | G01H 1/003 340/679 |
| 2007/0056369 A1 | 3/2007 | Griffin | |
| 2007/0273507 A1 | 11/2007 | Burchell | |
| 2008/0030324 A1 | 2/2008 | Bekritsky | |

(Continued)

FOREIGN PATENT DOCUMENTS

| | | |
|---|---|---|
| EP | 1164550 A2 | 2/2001 |
| EP | 1615091 A1 | 1/2006 |

(Continued)

*Primary Examiner* — Hongmin Fan
(74) *Attorney, Agent, or Firm* — Garcia-Zamor Intellectual Property Law, LLC; Ruy Garcia-Zamor; Bryan Peckjian

(57) ABSTRACT

A condition monitoring system for monitoring the condition of a machine providing at least one rotating component, at least one sticker having a vibration status indicator that is arranged to indicate when a vibration of the component exceeds a predetermined level, and a device that is arranged to collect information from the at least one sticker.

18 Claims, 3 Drawing Sheets

Fig. 1

(56) References Cited

U.S. PATENT DOCUMENTS

| | | |
|---|---|---|
| 2008/0232427 A1 | 9/2008 | Leute |
| 2009/0102656 A1 | 4/2009 | Goodman |
| 2009/0231153 A1 | 9/2009 | Hauenstein |
| 2014/0055244 A1 | 2/2014 | Burchell |
| 2015/0233418 A1* | 8/2015 | Brehm ................ F16C 33/7816 384/448 |
| 2015/0310715 A1 | 10/2015 | Nekoogar |
| 2015/0317896 A1 | 11/2015 | Planton |
| 2015/0339499 A1 | 11/2015 | Nekoogar |
| 2016/0125719 A1* | 5/2016 | Murphy ............... G08B 21/187 340/682 |

FOREIGN PATENT DOCUMENTS

| | | |
|---|---|---|
| JP | 2006027773 A | 2/2006 |
| JP | 2006044740 A | 2/2006 |
| JP | 2006048374 A | 2/2006 |
| WO | 2004072747 A1 | 8/2004 |
| WO | 2012128249 A1 | 9/2012 |
| WO | 2013160053 A1 | 10/2013 |

* cited by examiner

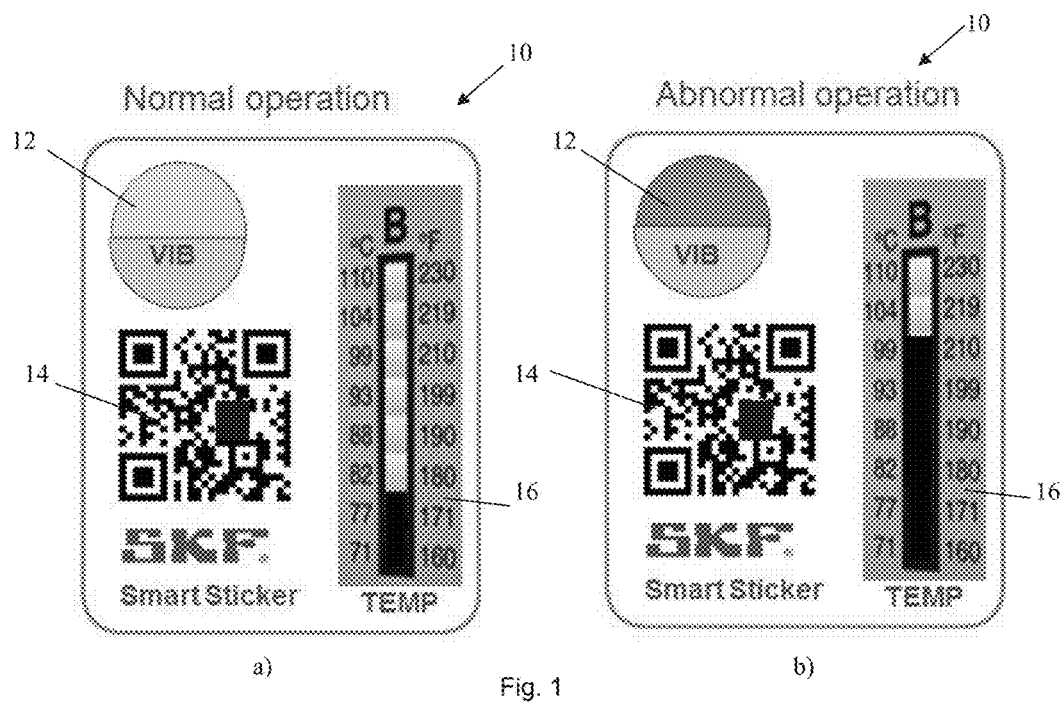
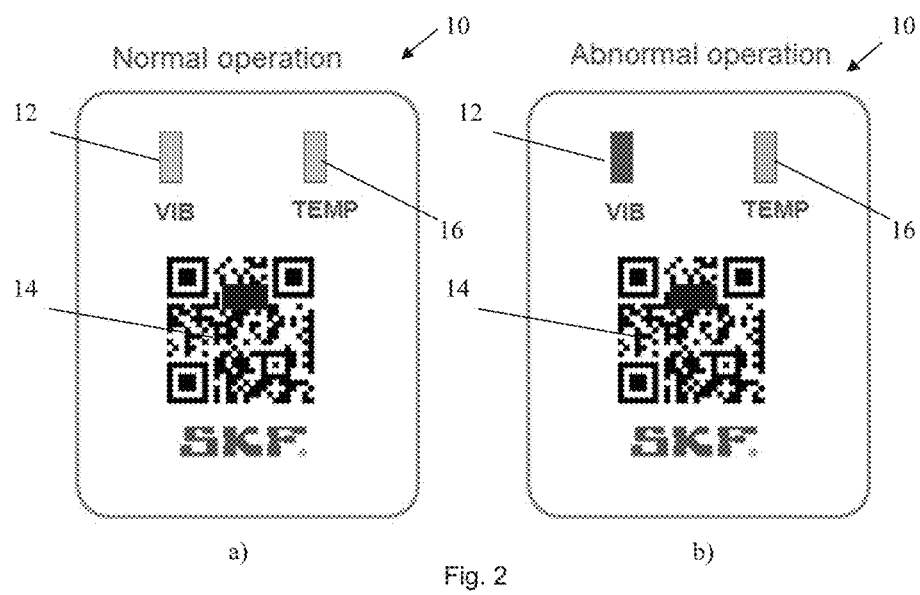

STICKER, CONDITION MONITORING SYSTEM, METHOD AND COMPUTER PROGRAM PRODUCT

CROSS REFERENCE TO RELATED APPLICATIONS

This application is a divisional of U.S. patent application Ser. No. 15/407,032, filed Jan. 16, 2017, which claims the benefit of Swedish patent application number 1650073-8, filed on Jan. 22, 2016, the contents of which are both fully incorporated herein by reference.

FIELD OF THE INVENTION

The present invention concerns a sticker for attaching to a machine comprising at least one rotating component that is to be monitored and a condition monitoring system for monitoring machine comprising at least one rotating, which provides at least one such sticker and at least one device that is arranged to collect data from at least one such sticker. The present invention also concerns a method and computer program product for monitoring the condition of a machine comprising at least one rotating component.

BACKGROUND OF THE INVENTION

Condition monitoring is the process of determining the condition of machines comprising rotating components while the rotating components are in operation. Condition monitoring enables the repair of problem components prior to their failure and not only helps plant personnel reduce the possibility of catastrophic failure, but also allows them to order parts in advance, schedule manpower, and plan other repairs during downtime.

Rotating components such as bearings are often used in critical applications, wherein their failure in service would result in significant commercial loss to the end-user. It is therefore important to monitor such rotating components in order to plan intervention in a way that avoids failure in service, while minimizing the losses that may arise from taking the machinery in question out of service to replace the bearing.

The residual life of a rolling-element bearing is generally determined by fatigue of the operating surfaces as a result of repeated stresses in operational use. Fatigue failure of a rolling element bearing results from progressive flaking or pitting of the surfaces of the rolling elements and of the surfaces of the corresponding bearing races. The flaking and pitting may cause seizure of one or more of the rolling elements, which in turn may generate excessive heat, pressure and friction.

Bearings are selected for a specific application on the basis of a calculated or predicted residual life expectancy compatible with the expected type of service in the application in which they will be used. However, this type of life prediction is considered inadequate for the purpose of maintenance planning for several reasons.

One reason is that the actual operation conditions may be quite different from the nominal conditions. Another reason is that a bearing's residual life may be radically compromised by short-duration events or unplanned events, such as overloads, lubrication failures, installation errors, etc. Yet another reason is that, even if nominal operating conditions are accurately reproduced in service, the inherently random character of the fatigue process may give rise to large statistical variations in the actual residual life of substantially identical bearings.

In order to improve maintenance planning, it is common practice to monitor the values of physical quantities related to vibrations and temperature to which a component, such as a bearing, is subjected in operational use, so as to be able to detect the first signs of impending failure.

In a condition monitoring system data is usually obtained from at least one sensor provided on a machine housing close to the rotating component that is to be monitored and this data is usually transmitted in a wired or wireless manner and displayed to an analyst. This can however result in long transmission and display times and the data can be difficult to display or interpret. The transmission, display, storage and interpretation of such data can require a significant amount of energy, time and expertise, and consequently decreases the rate at which measurements and analyses can be made.

BRIEF SUMMARY OF THE INVENTION

An object of the invention is to provide an improved way of monitoring a machine comprising at least one rotating component.

This object is achieved by using a sticker for attaching to a machine comprising at least one rotating component that is to be monitored, i.e. directly to a part of a machine comprising at least one rotating, its housing, or indirectly in the vicinity of a component part or its housing. The sticker provides a vibration status indicator that is arranged to indicate when the vibration of the machine comprising at least one rotating component exceeds a predetermined level.

Such a sticker can immediately attract the attention of an operator and allows a user to quickly and simply determine that the machine comprising at least one rotating component is not operating in a way which may be detrimental to the at least one rotating component being monitored. Information concerning the vibration status of at least one part of the machine comprising at least one rotating component during operation may namely be obtained merely by looking at the sticker, whereby a user and/or component manufacturer will obtain a graphic YES/NO answer to the question of whether a machine comprising at least one rotating component is vibrating excessively during use.

Alternatively or additionally, an image of the sticker may be captured, by scanning or photographing the sticker and transmitting an image to a user and/or machine/component manufacturer for analysis using image recognition and/or image analysis for example and/or for storage. Using such a sticker avoids the need to transmit and/or display and/or store actual vibration data. Data processing times may be shorter and memory storage requirements may be lower.

A user and/or a machine/component manufacturer can thereby be warned that the machine comprising at least one rotating component is operating in a way which may be detrimental to the at least one rotating component being monitored. Excessive vibration may be caused by poor installation, poor operating practices, such as misalignment, imbalance, lubrication failure and contamination, excessive loads, excessive operating speed, fatigue failure, wear, overheating, corrosion and/or exposure to mechanical shocks etc. Such causes of excessive vibration may reduce the residual life of the machine comprising at least one rotating component if left uncorrected. The vibration status information obtained from the sticker may be used for determining when it is necessary or desirable to check, service or replace or refurbish a rotating component being monitored.

The word "sticker" as used in this document is intended to mean a piece of material, such as paper, plastic or metal or any other suitable material or combination of materials. The sticker is arranged to be permanently or non-permanently attached to at least part of a machine comprising at least one rotating component that is to be monitored or in the vicinity thereof, by means of adhesion for example. The vibration status indicator is placed in a location where it may be seen and/or accessed by a user or by a device that is arranged to collect information from the sticker, such as a device comprising image-capturing means.

According to an embodiment of the invention the vibration status indicator provides a container containing fluid and a coloring agent, which can be any physical or chemical coloring agent, and which is arranged to change the color of the fluid or impart color thereto when the vibration of the machine comprising at least one rotating component exceeds a predetermined level. The provision of color or change in color should be readily detected by the human eye and/or by a device collecting information from the sticker.

Alternatively or additionally, the vibration status indicator provides a piezoelectric element that is arranged generate electricity when the vibration of the machine comprising at least one rotating component exceeds a predetermined level. The electricity may for example be used to power a Light Emitting Diode (LED) that indicates that the vibration of the machine comprising at least one rotating component has exceeded a predetermined level.

Alternatively or additionally, the vibration status indicator provides a printed symbol, such as a grid, which is arranged to become blurred when viewed or photographed when the vibration of the machine comprising at least one rotating component exceeds a predetermined level.

Alternatively or additionally, the vibration status indicator provides a material that is arranged to detectably change one of its properties, such as its color, shape or size when the vibration of the machine comprising at least one rotating component has exceeded a predetermined level.

According to an embodiment of the invention the sticker provides a machine-readable label, such as a Quick Response (QR) code or bar code, which contains information about the machine comprising at least one rotating component, such as a serial number and/or type of the rotating component and/or information from a manufacturer. The information contained in this machine-readable label may be associated with data collected from the sticker during the use of the machine comprising at least one rotating component, whereby the performance of that machine comprising at least one rotating component may be tracked and optionally recorded. Optionally the machine-readable label, if provided together with a machine comprising at least one rotating component or rotating component, may be used as a counterfeit check by an end-user to check the authenticity of the machine comprising at least one rotating component or rotating component.

According to an embodiment of the invention the sticker provides a temperature indicator and optionally a temperature sensor that shows actual temperature readings, which provides an indicator element (a temperature scale or an LED for example) that is arranged to indicate when a temperature of the machine comprising at least one rotating component exceeds a predetermined temperature.

According to an embodiment of the invention the sticker provides at least one alarm arranged to indicate an alarm condition. For example, an optic and or acoustic alarm signal may be issued by a sticker and/or by a device collecting information from the sticker or by a processor processing information collected by the device when excessive vibration and/or excessive temperature is detected.

According to an embodiment of the invention the sticker provides energy-harvesting means to utilize energy generated by the machine comprising at least one rotating component. Such harvested energy may be used to transmit simple digital information from the sticker.

According to an embodiment of the invention the rotating component that is to be monitored is at least part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, a gear, or a component for an application in which it is subjected to alternating Hertzian stresses.

The present invention also concerns a condition monitoring system for monitoring the condition of at least one machine comprising at least one rotating component, which provides at least one sticker according to any of the embodiments of the invention and a device that is arranged to collect information from the at least one sticker. Information may be collected from the sticker continuously, periodically, randomly, on request and/or at any suitable time.

According to an embodiment of the invention the device is arranged to collect an image from the at least one sticker.

According to an embodiment of the invention the condition monitoring system provides a user interface that is arranged to allow a user and/or manufacturer to input information concerning the machine comprising at least one rotating component and/or at least one rotating component, which inputted information is associated with the at least one sticker.

According to an embodiment of the invention the condition monitoring system provides a processor arranged to process information collected from the at least one sticker.

According to an embodiment of the invention the condition monitoring system provides storage means arranged to store information collected from the at least one sticker.

According to an embodiment of the invention the condition monitoring system provides and is arranged to provide a list of machine models and/or information about the machine models. A user of a condition monitoring system may namely be offered a list of machine models containing one or more different types of machine, such as electric motors, pumps, gearboxes etc. A user may select a machine that is to be monitored from the list of machine models and link at least one rotating component of that machine to the machine using at least one sticker.

The present invention also concerns a method for monitoring a condition of at least one machine comprising at least one rotating component. The method provides the steps of attaching at least one sticker according to any of the embodiments of the invention to at least one part of a machine comprising at least one rotating component, (optionally associating the at least one sticker with the machine comprising at least one rotating component), and collecting information from the at least one sticker in order to monitor the condition of the machine comprising at least one rotating component.

The present invention further concerns a computer program product, such as an application, that provides a computer program containing computer program code means arranged to cause a computer or a processor to execute the steps of associating at least one sticker with at least one machine comprising at least one rotating component and collecting information from the at least one sticker in a method according to any of the embodiments of the invention, which computer program is stored on a computer-readable medium or a carrier wave.

The sticker, condition monitoring system, method, and/or computer program product according to the present invention may be used to monitor any machine comprising at least one rotating component used in automotive, aerospace, railroad, mining, wind, marine, metal producing or any other application in which excessive vibration of at least part of the machine comprising at least one rotating component is not desired.

It should be noted that any feature of one embodiment of the invention may be combined with any other feature of any other embodiment of the invention unless the description explicitly excludes such a combination.

BRIEF DESCRIPTION OF THE SEVERAL VIEWS OF THE DRAWING

The present invention will hereinafter be further explained by means of non-limiting examples with reference to the appended schematic figures where;

FIG. 1 shows a sticker according to an embodiment of the invention in both the normal and abnormal operation of a machine comprising at least one rotating component being monitored, FIG. 2 shows a sticker according to another embodiment of the invention in both the normal and abnormal operation of a machine comprising at least one rotating component being monitored.

Figure 3:
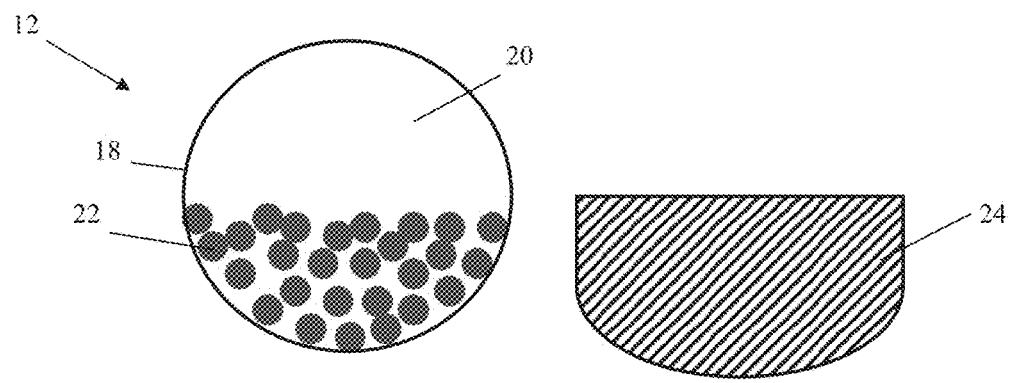
FIG. 3 shows a vibration status indicator according to an embodiment of the invention.

It should be noted that the drawings have not necessarily been drawn to scale and that the dimensions of certain features may have been exaggerated for the sake of clarity.

DETAILED DESCRIPTION OF THE INVENTION

FIG. 1a) shows a sticker 10 for attaching to at least one part of a machine 11 comprising at least one rotating component that is to be monitored during normal operation of the machine 11 comprising at least one rotating component where the vibration level of the machine 11 comprising at least one rotating component does not exceed a predetermined level but lies within a normal range for that machine 11 comprising at least one rotating component in that application. The predetermined level may be determined/selected by a manufacturer or user depending on the machine 11 comprising at least one rotating component and the application in which the machine 11 comprising at least one rotating component is used. A manufacturer will namely provide different stickers 10 having different vibration status indicators 12 for use with different components and/or for use in different applications. A manufacturer may provide a suitable sticker 10 on a machine 11 comprising at least one rotating component or rotating component supplied to an end-user or within the machine 11 or rotating component packaging.

During normal operating conditions neither the vibration level nor the temperature of the machine comprising at least one rotating component exceeds a predetermined level/value, but lies within a normal range for a particular component in a particular application. The predetermined level may be determined/selected by a manufacturer or user depending on the machine comprising at least one rotating component and the application in which the machine comprising at least one rotating component is used. A machine or component manufacturer may provide a suitable sticker 10 on a machine comprising at least one rotating component supplied to an end-user or within the component packaging.

FIG. 1b) shows the same sticker 10 during abnormal operation of the machine 11 comprising at least one rotating component where the vibration level and the temperature of the machine 11 comprising at least one rotating component exceeds a predetermined level/value and lies above what is considered to be a normal vibration/temperature range for that machine 11 comprising at least one rotating component in that application. The vibration status indicator LED 12 lights up or changes color indicating that the vibration of the at least one part of a machine comprising at least one rotating component that is being monitored has exceeded a predetermined level.

The sticker 10 illustrated in FIG. 1 namely provides a vibration status indicator 12 that is arranged to indicate when a vibration of the machine 11 comprising at least one rotating component exceeds a predetermined level, which predetermined level/value may be changed depending on the machine model, application and/or operating conditions in which the machine is used. The sticker 10 may be a paper label comprising an adhesive and its rear surface, whereby the sticker 10 may be removably attached to the surface of a part of a machine 11 comprising at least one rotating component by pressing the adhesive backing of the sticker 10 against the surface. Alternatively, the sticker may be stuck to a surface in the vicinity of the machine 11 comprising at least one rotating component that is to be monitored.

The sticker 10 illustrated in FIG. 1 provides a vibration status indicator 12 that is arranged to change color when the vibration of part of the machine 11 comprising at least one rotating component to which the sticker is attached 10 exceeds a predetermined level. For example, the vibration status indicator 12 may be arranged to be green when vibration is at or below the predetermined level and to be red when the vibration exceeds that predetermined level. Such a change in color may be readily detected by a user looking at the sticker or by a device collecting information from the sticker, such as a camera that captures an image of the sticker 10 for image recognition and/or processing.

Alternatively or additionally, the vibration status indicator 12 may provide a printed symbol, such as a grid (not shown), which is arranged to become blurred when the vibration of the machine 11 comprising at least one rotating component exceeds a predetermined level, for example when the features of the symbol are made to move at a speed of 7 mm/s or more due to the vibration of the machine 11 comprising at least one rotating component being monitored.

The sticker 10 illustrated in FIG. 1 also provides a machine-readable label 14, such as a Quick Response (QR) code or bar code, which contains information about the t least one rotating component that is installed in the machine, such as a unique serial number for the at least one rotating component and/or type of the machine or the at least one rotating component and/or information about how the machine or the at least one rotating component should be used. A user may scan or photograph this machine-readable label 14 and associate at least one rotating component being monitored with a particular machine in a plant and/or location of a machine, and/or a geographical location and/or an end-user and/or installation date and/or days/hours of use, so that information collected from the sticker 10 and any other relevant information inputted by a user or manufacturer can be associated with a particular rotating component in a particular machine.

The sticker 10 illustrated in FIG. 1 further provides a temperature indicator 16, namely a thermometer, which comprising an indicator element (a temperature scale) that is arranged to indicate when a temperature of the machine 11 comprising at least one rotating component exceeds a predetermined temperature. In the illustrated embodiment the temperature indicator 16 is also a temperature sensor that shows an actual temperature reading. The thermometer will indicate when the temperature of the part of the machine 11 comprising at least one rotating component being monitored exceeds a predetermined temperature, such as 100° C.

The sticker 10 according to the present invention may be of any size, thickness, color and shape and may optionally contain more information, devices or sensors than those illustrated or described herein. For example, the sticker 10 may provide energy-harvesting means to utilize energy generated by a machine 11 comprising at least one rotating component being monitored, a battery or energy-generating means, such as a solar panel.

According to an embodiment of the invention once an excessive vibration or temperature has been detected, a vibration status indicator 12 and/or a temperature status indicator 16 may be arranged to remain in the state of indicating excessive vibration or excessive temperature respectively so that a user does not miss the fact that an excessive vibration or temperature has been detected. However, according to an alternative embodiment of the invention, once an excessive vibration or temperature has been detected, a vibration status indicator 12 and/or a temperature status indicator 16 may be arranged to revert to the state of indicating that no excessive vibration or no excessive temperature have been detected respectively.

FIG. 2a) shows a sticker 10 according to another embodiment of the invention for attaching to at least one part of a machine 11 comprising at least one rotating component that is to be monitored during normal operation of the machine 11 comprising at least one rotating component where the vibration level of the machine 11 comprising at least one rotating component does not exceed a predetermined level but lies within a normal range for that machine 11 comprising at least one rotating component in that application.

FIG. 2b) shows the same sticker 10 during abnormal operation of the machine 11 comprising at least one rotating component where the vibration level of the machine 11 comprising at least one rotating component exceeds a predetermined level and lies above what is considered to be a normal vibration range for that machine 11 comprising at least one rotating component in that application.

The sticker 10 illustrated in FIG. 2 provides two LEDs labelled "VIB" 12 and "TEMP" 16, which are arranged to light up when the vibration or the temperature of the machine 11 comprising at least one rotating component that they monitoring exceeds a predetermined level, whereby the light is detectable to the human eye and/or to a device that collects information from the sticker 10.

A sticker 10 according to the present invention is used to monitor the operation of at least one rotating component 28 in at least one machine 11, but may also be used to detect faults such as imbalance and misalignment of one or more machines 11, i.e. not only faults caused by at least one rotating component 28.

FIG. 3 shows constituent parts of a vibration status indicator 12 such as the one illustrated in FIG. 1. The vibration status indicator 12 provides a container 18 containing fluid 20, i.e. a liquid or gas, and a coloring agent 22 that is arranged to change the color of the fluid within the container when the vibration of the machine 11 comprising at least one rotating component exceeds a predetermined level, whereby the change in color may be readily detected by a user looking at the sticker or a device collecting information from the sticker 10 comprising the vibration status indicator 12.

In the illustrated embodiment the coloring agent 22 consists of colored particles, such as particles of a red pigment or small plastic spheres. In normal operation, the coloring agent will remain in the lower part of the container 18 behind a cover 24 that covers the lower part of the container 18 (which cover 24 has been drawn to the right of the container in FIG. 3 for the sake of clarity). When the vibration of a machine 11 comprising at least one rotating component being monitored exceeds a predetermined level, turbulence created within the fluid 20 will cause the coloring agent 22 to mix with the fluid in the upper part of the container 20 above the cover 24.

Figure 4:
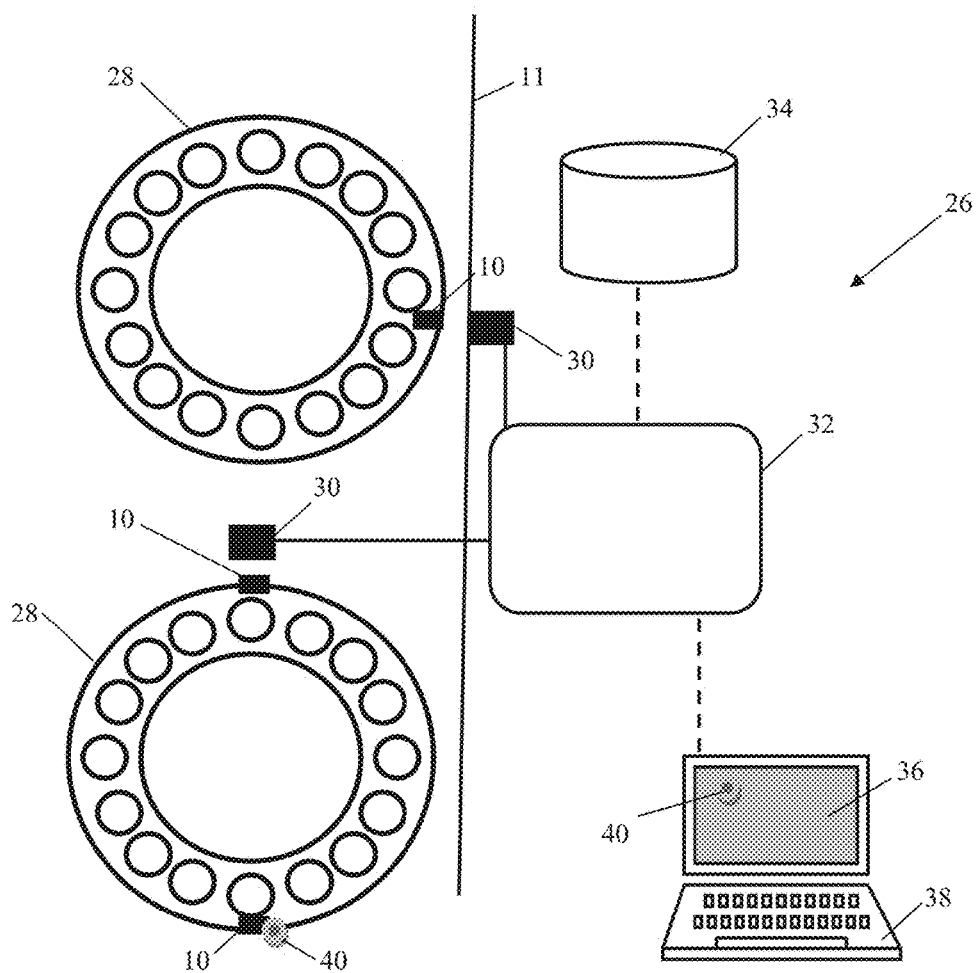
FIG. 4 shows a condition monitoring system according to an embodiment of the invention.

FIG. 4 shows a condition monitoring system 26 according to an embodiment of the invention. The condition monitoring system 26 may be used for monitoring the condition of machine 11 comprising at least one rotating component 28, and provides one sticker 10 or a plurality of stickers 10 according to any of the embodiments of the invention and one or more devices 30 that is/are arranged to collect information from one or more stickers 10. One or more stickers 10 may be attached to each machine 11 comprising at least one rotating component 28. Alternatively, a single sticker 10 may be located between a plurality of machines 11 comprising at least one rotating component 28 in order to detect vibration levels therebetween.

The illustrated embodiment shows a condition monitoring system 26 for monitoring the condition of a machine 11 comprising two rolling element bearings 28 during their use. The inner ring and/or outer ring of each bearing 28 may be of any size and have any load-carrying capacity. An inner ring and/or an outer ring may for example have a diameter up to a few meters and a load-carrying capacity up to many thousands of tons. The system 10 according to the present invention may however be used to monitor the condition of one or more machines comprising one or more rotating components of any type, and not necessarily all of the same type or size.

The devices 30 may be hand-held and/or portable or non-portable devices that can be carried or moved by a user, to scan or photograph each sticker for example, or they may be fixed in a particular location to collect information from one or more stickers 10. A device 30 may be a mobile telephone, media player, Personal Communications System (PCS) terminal, Personal Data Assistant (PDA), laptop computer, palmtop receiver, or camera. A device 30 may for example provide an application that provides a computer program containing computer program code means arranged to cause a computer or a processor 32 to execute the steps of associating at least one sticker 10 with at least one machine 11 comprising at least one rotating component 28 and collecting information from the at least one sticker 10 in a method according to any of the embodiments of the invention.

The condition monitoring system 26 may provide a processor 32 arranged to process information collected from at least one sticker 10. Data may be transmitted from a device 30 to a central, local or remote processor 32 in a wired or wireless manner over a wireless communication network.

Alternatively or additionally, at least one device 30 may provide a process 32 for analyzing the data from a sticker 10. The processor 32 may provide image recognition and/or image processing software. The condition monitoring system 26 may also provide and be arranged to provide a list of machine models and information concerning each machine model, such as the position of at least one rotating component in a machine, alarm limits, behavior characteristics. These pre-defined machine models may be used by an operator during the commissioning.

The condition monitoring system 26 may also provide storage means 34, such as a database, arranged to store information collected from at least one sticker 10, whereby the information is preferably stored in a way that it can be readily associated with a particular machine 11 comprising at least one rotating component 28 being monitored. The storage means 34 may be maintained by a manufacturer of the machine(s) 11 comprising at least one rotating component 28 being monitored. The data collected from a plurality of machines 11 comprising at least one rotating component 28 of a particular type used in the same or similar application(s) may enable a manufacturer to track the performance of machine 11 comprising at least one rotating component and/or extract further information about relationships between the performance of different machine 11 comprising rotating components of different component types and conditions of usage so as to further improve the service to end-users.

The condition monitoring system 26 may provide display means 36, such as a display screen in any central, remote or local location, or in one or more of the devices 30 that is/are arranged to collect information from one or more stickers 10 so that a user and/or manufacturer can view data being collected or stored data.

It should be noted that not all of the components of the condition monitoring system 26 necessarily need to be located in the vicinity of the machine 11 comprising at least one rotating component 28 being monitored. For example, the storage means 34 may located at a remote location and communicate with at least one processor 32 and/or at least one device 30 for collecting information by means of a server for example. Alternatively, the processor 32, display means 36, user interface 30, storage means 34 may all be located in the same unit such as a personal computer or a device 30 for collecting information from at least one sticker 10.

The condition monitoring system 26 may even provide a user interface 38 that is arranged to allow a user and/or manufacturer to input information concerning at least one machine 11 comprising at least one rotating component 28 being monitored, which inputted information may be associated with at least one sticker 10 and optionally stored with information collected from the at least one sticker 10 and/or sent to a manufacturer of the at least one machine 11 comprising at least one rotating component 28 being monitored. Such a user interface 38 may be incorporated into one or more devices 30 that is/are arranged to collect information from one or more stickers 10.

A sticker 10 according to the present invention may provide at least one alarm 40 arranged to indicate an alarm condition such as excessive vibration or an excessively high temperature. The alarm 40 may for example issue an optical and/or acoustic signal when the vibration or the temperature of a part of a machine 11 comprising at least one rotating component 28 being monitored exceeds a predetermined level. Such an alarm 40 may be arranged to be seen and/or heard via display means 36 or via a device 30 that is arranged to collect information from one or more stickers 10 instead of, or in addition to on a sticker 10 itself. This alarm 40 could be used as a trigger to ensure that a machine 11 comprising at least one rotating component 28 being monitored is checked immediately.

Notification of when it is advisable to service, replace or refurbish one or more machines 11 comprising at least one rotating component 28, or at least one rotating component being monitored by the condition monitoring system 26 may be made in any suitable manner, such as via a communication network, via an e-mail or telephone call, a letter, facsimile, alarm signal, or a visiting representative of the manufacturer. Once a component 28 has been replaced, a new sticker may be attached to the replacement component 28.

Figure 5:
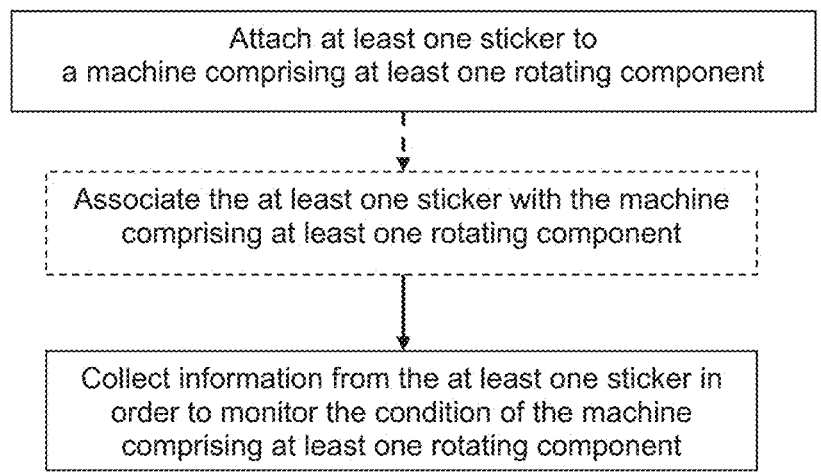
FIG. 5 is a flow chart showing the steps of a method according to an embodiment of the invention.

FIG. 5 is a flow chart showing the steps of a method according to an embodiment of the invention. The method provides the steps of attaching at least one sticker according to any of the embodiments of the invention to at least one part of a machine 11 comprising at least one rotating component (which step may be carried out by a manufacturer or user), optionally associating the at least one sticker with additional information concerning the at least one machine 11 comprising at least one rotating component, and collecting information from the at least one sticker in order to monitor the condition of the machine 11 comprising at least one rotating component. The collected information may then be analyzed, sent and/or displayed to a user and/or component manufacturer, and/or stored.

Further modifications of the invention within the scope of the claims would be apparent to a skilled person.

The invention claimed is:

1. A condition monitoring system for monitoring the condition of a machine, the condition monitoring system comprising:
   at least one rotating component,
   at least one sticker coupled to the at least one rotating component, the at least one sticker comprising a vibration status indicator indicating when a vibration of a component exceeds a predetermined level, and
   a device collecting information from the at least one sticker,
   wherein the device collects the information via an image from the at least one sticker.

2. The condition monitoring system according to claim 1, wherein the condition monitoring system further comprises:
   a user interface receiving user input information concerning the machine or the component, the user input information being associated with the at least one sticker.

3. The condition monitoring system according to claims 1, wherein the condition monitoring system further comprises: a processor processing the information collected from the at least one sticker.

4. The condition monitoring system according to claim 1, wherein the condition monitoring system further comprises:
   a storage means storing information collected from the at least one sticker.

5. The condition monitoring system according to claim 1, wherein the condition monitoring system providing a list of machine models or information regarding the machine models.

6. The condition monitoring system according to claim 1, wherein the vibration status indicator comprises a container containing a fluid and containing a coloring agent, wherein the coloring agent changes a color of the fluid when the vibration of the at least one rotating component exceeds the predetermined level.

7. The condition monitoring system according to claim 1, wherein the vibration status indicator comprises a piezoelectric element generating electricity when the vibration of the at least one rotating component exceeds the predetermined level.

8. The condition monitoring system according to claim 1, wherein the vibration status indicator comprises a printed symbol that blurs when the vibration of the at least one rotating component exceeds the predetermined level.

9. The condition monitoring system according to claim 1, wherein at least one sticker comprises a machine-readable label providing information about the machine, the information comprising a serial number of the at least one rotating component.

10. The condition monitoring system according to claim 1, wherein at least one sticker comprises a temperature indicator including an indicator element indicating when a temperature of the machine exceeds a predetermined temperature.

11. The condition monitoring system according to claim 1, wherein at least one sticker comprises at least one alarm indicating element when an alarm condition occurs.

12. The condition monitoring system according to claim 1, wherein at least one sticker comprises an energy-harvesting component utilizing energy generated by the machine.

13. The condition monitoring system according to claim 1, wherein the at least one rotating component comprises a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, a gear, or a component subjected to alternating Hertzian stresses.

14. A method for monitoring a condition of a machine comprising at least one rotating component, the method comprising:
    attaching at least one sticker to at least one part of the machine comprising the at least one rotating component, the at least one sticker comprising a vibration status indicator indicating when a vibration of the component exceeds a predetermined; and
    collecting, by a device, information from the at least one sticker to monitor the condition of the machine,
    wherein the device collects the information via an image from the at least one sticker.

15. The method according to claim 14, wherein the vibration status indicator comprises a container containing a fluid and containing a coloring agent,
    wherein the coloring agent changes a color of the fluid when the vibration of the at least one rotating component exceeds the predetermined level.

16. The method according to claim 14, wherein the vibration status indicator comprises a piezoelectric element generating electricity when the vibration of the at least one rotating component exceeds the predetermined level.

17. The method according to claim 14, wherein the vibration status indicator comprises a printed symbol that blurs when the vibration of the at least one rotating component exceeds the predetermined level.

18. The method according to claim 14, wherein at least one sticker comprises a machine-readable label providing information about the machine, the information comprising a serial number of the at least one rotating component.

* * * * *